US010654564B2

(12) United States Patent
Cokonaj et al.

(10) Patent No.: US 10,654,564 B2
(45) Date of Patent: May 19, 2020

(54) AIRCRAFT ASSEMBLY INCLUDING DEFLECTION SENSOR

(71) Applicant: Safran Landing Systems UK LTD, Gloucester (GB)

(72) Inventors: Valerijan Cokonaj, Gloucester (GB); Laura Collett, Gloucester (GB)

(73) Assignee: Safran Landing Systems UK LTD (GB)

( * ) Notice: Subject to any disclaimer, the term of this patent is extended or adjusted under 35 U.S.C. 154(b) by 145 days.

(21) Appl. No.: 15/833,549

(22) Filed: Dec. 6, 2017

(65) Prior Publication Data

US 2018/0170531 A1     Jun. 21, 2018

(30) Foreign Application Priority Data

Dec. 15, 2016    (EP) ..................................... 16204453

(51) Int. Cl.
| | |
|---|---|
| *B64C 25/58* | (2006.01) |
| *B64D 45/00* | (2006.01) |
| *G01C 19/5776* | (2012.01) |
| *B64C 25/02* | (2006.01) |

(52) U.S. Cl.
CPC .......... *B64C 25/58* (2013.01); *B64D 45/0005* (2013.01); *G01C 19/5776* (2013.01); *B64C 25/02* (2013.01); *B64D 2045/0085* (2013.01)

(58) Field of Classification Search
CPC .................................................... B64C 25/58
See application file for complete search history.

(56) References Cited

U.S. PATENT DOCUMENTS

| 3,584,503 A | 6/1971 | Senour |
| 3,701,279 A | 10/1972 | Harris et al. |
| 3,713,333 A | 1/1973 | MacGeorge |
| | (Continued) | |

FOREIGN PATENT DOCUMENTS

| CN | 102072729 A | 5/2011 |
| EP | 0578519 A1 | 12/1994 |
| | (Continued) | |

OTHER PUBLICATIONS

Extended European Search Report for European Application No. 16204453.1-1754, dated May 29, 2017—7 pages.

*Primary Examiner* — Bao Long T Nguyen
*Assistant Examiner* — Michael A Berns
(74) *Attorney, Agent, or Firm* — RatnerPrestia

(57) ABSTRACT

An aircraft assembly having a first region, a second region spaced from the first region by a flexible region, and a deflection sensor. The first region has greater positional stability than the second region such that the second region deflects further from its default position than the first region during in-use loads. The deflection sensor includes a first gyroscope at the first region to generate a first signal representing rotation of the first region about one or more orthogonal axes, and a second gyroscope at the second region to generate a second signal representing rotation of the second region about the one or more axes. The second gyroscope is synchronised in time with the first. A controller subtracts one of the first and second signals from the other to obtain a differential signal representing deflection of the second region relative to the first due to flexing of the flexible region.

15 Claims, 7 Drawing Sheets

(56) References Cited

U.S. PATENT DOCUMENTS

| | | |
|---|---|---|
| 4,110,605 A | 8/1978 | Miller |
| 4,312,042 A | 1/1982 | Bateman |
| 4,422,603 A * | 12/1983 | Turiot ................ B64C 25/20 |
| | | 244/102 R |
| 4,507,742 A | 3/1985 | Bateman |
| 4,700,910 A | 10/1987 | Brady |
| 4,775,018 A | 10/1988 | Kroll et al. |
| 4,843,554 A | 6/1989 | Middleton et al. |
| 5,184,465 A | 2/1993 | Howard et al. |
| 5,214,586 A | 5/1993 | Nance |
| 5,257,756 A | 11/1993 | Patzig et al. |
| RE34,695 E | 8/1994 | Weinstein |
| 5,548,517 A | 8/1996 | Nance |
| 5,574,220 A | 11/1996 | Amand et al. |
| 6,237,406 B1 | 5/2001 | Nance |
| 6,273,613 B1 | 8/2001 | O'Brien et al. |
| 6,421,615 B1 | 7/2002 | Nakajima et al. |
| 6,474,161 B1 | 11/2002 | Jeanroy et al. |
| 6,522,992 B1 * | 2/2003 | McCall ................ G01C 21/16 |
| | | 701/4 |
| 6,676,075 B2 | 1/2004 | Cowan et al. |
| 6,877,374 B2 * | 4/2005 | Geen ................ G01C 19/5719 |
| | | 73/504.14 |
| 6,898,584 B1 | 5/2005 | McCool et al. |
| 6,902,136 B2 | 6/2005 | Mackness |
| 6,984,994 B2 | 1/2006 | Gregg |
| 7,159,470 B2 | 1/2007 | Saguto |
| 7,193,530 B2 | 3/2007 | Nance |
| 7,274,309 B2 * | 9/2007 | Nance ................ B64D 45/00 |
| | | 244/100 R |
| 7,274,310 B1 | 9/2007 | Nance |
| 7,296,006 B2 | 11/2007 | Flynn et al. |
| 7,552,803 B2 | 6/2009 | Luce |
| 7,621,193 B2 | 11/2009 | Fay et al. |
| 7,680,630 B2 | 3/2010 | Schmidt |
| 7,683,274 B2 | 3/2010 | Dellac et al. |
| 7,901,358 B2 | 3/2011 | Mehi et al. |
| 7,942,046 B2 | 5/2011 | Jones |
| 7,946,165 B2 | 5/2011 | Cahill |
| 7,983,854 B2 | 7/2011 | O'Brien |
| 8,042,765 B1 | 10/2011 | Nance |
| 8,055,396 B2 | 11/2011 | Yates et al. |
| 8,060,296 B2 | 11/2011 | Vetsch |
| 8,068,975 B2 | 11/2011 | Jensen et al. |
| 8,082,799 B2 | 12/2011 | Oudovikine |
| 8,109,145 B2 | 2/2012 | Stewart |
| 8,180,504 B1 | 5/2012 | Nance |
| 8,181,532 B2 | 5/2012 | Schmidt et al. |
| 8,212,673 B1 | 7/2012 | Whittaker |
| 8,235,326 B2 | 8/2012 | Briancourt et al. |
| 8,359,932 B2 | 1/2013 | Eriksen et al. |
| 8,398,029 B2 | 3/2013 | Leroy et al. |
| 8,478,457 B2 | 7/2013 | Bendisch et al. |
| 8,515,601 B2 | 8/2013 | Hugues |
| 8,532,957 B2 | 9/2013 | Cox et al. |
| 8,539,843 B2 | 9/2013 | Inns et al. |
| 8,540,183 B2 | 9/2013 | Morris et al. |
| 8,543,322 B1 | 9/2013 | Nance |
| 8,627,727 B2 | 1/2014 | Eriksen et al. |
| 8,775,013 B1 | 7/2014 | Smailus |
| 8,800,382 B2 | 8/2014 | Bennett |
| 8,814,096 B2 | 8/2014 | Spottiswoode et al. |
| 8,818,739 B2 | 8/2014 | Zakrzewski et al. |
| 8,843,326 B1 | 9/2014 | Lee |
| 8,855,886 B2 | 10/2014 | Rado |
| 8,862,377 B2 | 10/2014 | Khial et al. |
| 8,868,284 B2 | 10/2014 | Isom et al. |
| 8,903,572 B1 | 12/2014 | Hagelin et al. |
| 8,941,392 B1 * | 1/2015 | Reese ................ A61B 5/1071 |
| | | 324/671 |
| 9,033,275 B2 | 5/2015 | Barbieri et al. |
| 9,347,839 B2 | 5/2016 | Kohler |
| 9,879,973 B2 * | 1/2018 | Boisson ................ B64D 37/005 |
| 2005/0230200 A1 | 10/2005 | Seror |
| 2005/0234606 A1 | 10/2005 | Giazotto |
| 2006/0004499 A1 | 1/2006 | Trego et al. |
| 2006/0220918 A1 | 10/2006 | Stockwell et al. |
| 2006/0248953 A1 | 11/2006 | Lynch et al. |
| 2006/0284008 A1 | 12/2006 | Nance |
| 2006/0288796 A1 | 12/2006 | Giazotto |
| 2007/0008187 A1 | 1/2007 | Schmidt |
| 2008/0033607 A1 | 2/2008 | Zeliff et al. |
| 2008/0114506 A1 | 5/2008 | Davis et al. |
| 2008/0119967 A1 | 5/2008 | Long et al. |
| 2008/0262754 A1 | 10/2008 | Oudovikine |
| 2009/0026313 A1 | 1/2009 | Briancourt et al. |
| 2009/0122830 A1 | 5/2009 | Chomiki |
| 2009/0207047 A1 | 8/2009 | Ross |
| 2009/0293624 A1 | 12/2009 | Schmidt et al. |
| 2010/0045277 A1 | 2/2010 | Goldfine et al. |
| 2010/0064819 A1 | 3/2010 | Oudovikine |
| 2010/0161174 A1 | 6/2010 | Yates et al. |
| 2010/0268414 A1 | 10/2010 | Petillon et al. |
| 2010/0281967 A1 | 11/2010 | Cahill |
| 2011/0046825 A1 | 2/2011 | Lastere et al. |
| 2011/0087424 A1 | 4/2011 | Long et al. |
| 2011/0154907 A1 | 6/2011 | Schmidt et al. |
| 2011/0231037 A1 | 9/2011 | Stiharu et al. |
| 2011/0233328 A1 | 9/2011 | Alleau et al. |
| 2011/0276271 A1 | 11/2011 | Sim et al. |
| 2011/0303788 A1 | 12/2011 | Tripero et al. |
| 2011/0313614 A1 | 12/2011 | Hinnant et al. |
| 2012/0017124 A1 | 1/2012 | El-Bakry |
| 2012/0053783 A1 | 3/2012 | Nance |
| 2012/0095702 A1 | 4/2012 | Baird |
| 2012/0095703 A1 | 4/2012 | Zakrzewski et al. |
| 2012/0200168 A1 | 8/2012 | Verma et al. |
| 2012/0232723 A1 | 9/2012 | Nance |
| 2012/0268110 A1 | 10/2012 | Trunk et al. |
| 2013/0019680 A1 | 1/2013 | Kittilsland et al. |
| 2013/0044155 A1 | 2/2013 | Duce et al. |
| 2013/0060514 A1 | 3/2013 | Burke |
| 2013/0181090 A1 | 7/2013 | Elkington |
| 2013/0232803 A1 | 9/2013 | Romanelli |
| 2013/0238532 A1 | 9/2013 | Kearns et al. |
| 2013/0240664 A1 | 9/2013 | Cox et al. |
| 2013/0275059 A1 | 10/2013 | Bernhard et al. |
| 2013/0293358 A1 | 11/2013 | Hamel et al. |
| 2013/0294648 A1 | 11/2013 | Rhoads et al. |
| 2013/0304400 A1 | 11/2013 | Isom et al. |
| 2013/0312527 A1 | 11/2013 | Lomenzo |
| 2013/0312528 A1 | 11/2013 | Feydo |
| 2013/0321391 A1 | 12/2013 | Troy et al. |
| 2013/0327579 A1 | 12/2013 | Nance |
| 2013/0340511 A1 | 12/2013 | Miller et al. |
| 2013/0345992 A1 | 12/2013 | Chatellier |
| 2014/0012437 A1 | 1/2014 | Jones |
| 2014/0026808 A1 | 1/2014 | Hodgkinson et al. |
| 2014/0030092 A1 | 1/2014 | Heinig et al. |
| 2014/0060209 A1 | 3/2014 | Broillet et al. |
| 2014/0146897 A1 | 5/2014 | Malhan et al. |
| 2014/0152236 A1 | 6/2014 | Garshelis et al. |
| 2014/0157906 A1 | 6/2014 | Freshour |
| 2014/0210647 A1 | 7/2014 | Ataman |
| 2014/0217659 A1 | 8/2014 | Barnes et al. |
| 2014/0230569 A1 | 8/2014 | Schlipf et al. |
| 2014/0249700 A1 | 9/2014 | Elias et al. |
| 2014/0269824 A1 | 9/2014 | Miller et al. |
| 2015/0020609 A1 | 1/2015 | Gogolin |
| 2015/0039159 A1 | 2/2015 | Litwinowicz et al. |
| 2015/0039160 A1 | 2/2015 | Dos-Reis et al. |
| 2015/0041585 A1 | 2/2015 | Holloway et al. |
| 2015/0086083 A1 | 3/2015 | Chaudhry et al. |
| 2015/0100227 A1 | 4/2015 | Nance |
| 2015/0142353 A1 | 5/2015 | Cabret et al. |
| 2015/0247770 A1 | 9/2015 | Nance |
| 2015/0316438 A1 | 11/2015 | Nance |
| 2017/0016502 A1 * | 1/2017 | Simonneaux ............ B64C 25/58 |

(56) References Cited

U.S. PATENT DOCUMENTS

| | | | |
|---|---|---|---|
| 2018/0170531 A1* | 6/2018 | Cokonaj | B64C 25/58 |
| 2019/0002120 A1* | 1/2019 | Vinson | G07C 5/085 |

FOREIGN PATENT DOCUMENTS

| | | |
|---|---|---|
| EP | 0696728 A1 | 2/1996 |
| EP | 1147384 A1 | 10/2001 |
| EP | 1172656 A1 | 1/2002 |
| EP | 1998145 A2 | 12/2008 |
| EP | 2436598 A2 | 4/2012 |
| EP | 2450677 A1 | 5/2012 |
| EP | 2662676 A2 | 11/2013 |
| EP | 2728321 A1 | 5/2014 |
| EP | 2728348 A2 | 5/2014 |
| FR | 2875598 A1 | 3/2006 |
| FR | 2990027 A1 | 11/2013 |
| GB | 2497413 A | 6/2013 |
| WO | 0025272 A1 | 5/2000 |
| WO | 03067190 A1 | 8/2003 |
| WO | 2012123757 A2 | 9/2012 |
| WO | 2013068725 A1 | 5/2013 |
| WO | 2013178998 A2 | 12/2013 |
| WO | 2013178999 A1 | 12/2013 |
| WO | 2013188989 A1 | 12/2013 |
| WO | 2014001698 A2 | 1/2014 |
| WO | 2014031370 A1 | 2/2014 |
| WO | 2014135809 A1 | 9/2014 |
| WO | 2014153518 A1 | 9/2014 |
| WO | 2014162032 A1 | 10/2014 |
| WO | 2015006454 A1 | 1/2015 |
| WO | 2015019068 A1 | 2/2015 |
| WO | 2015026738 A1 | 2/2015 |

* cited by examiner

AIRCRAFT ASSEMBLY INCLUDING DEFLECTION SENSOR

This application claims the benefit of and priority to European Application EP 16204453.1, filed on Dec. 15, 2016, the contents of which are incorporated herein by reference.

BACKGROUND OF THE INVENTION

It is known to provide an aircraft with a health and usage monitoring system (HUMS). A HUMS can include one or more sensors arranged to monitor parts of the aircraft to determine for example whether the parts have been subjected to mechanical loads exceeding a predetermined acceptable limit.

One type of HUMS is known as an integrated vehicle health monitoring system (IVHMS), also known as an aircraft condition monitoring system (ACMS). An IVHMS is an integral part of an aircraft which is installed at the point of aircraft manufacture.

It is also known to provide a HUMS upgrade which can be retrofitted to an in-service aircraft by interfacing the HUMS with the aircraft's IVHMS and/or avionics system.

The present inventors have devised an improved sensor for use in a HUMS that can enable health and usage monitoring to be performed in an improved manner.

SUMMARY OF THE INVENTION

According to a first aspect of the present invention, there is provided an aircraft assembly comprising:
a first region;
a second region spaced from the first region by a flexible region, the first region having greater positional stability than the second region such that flexing of the flexible region about one or more orthogonal axes due to in-service loads causes the second region to deflect further from its default or unloaded position than the first region deflects from its default or unloaded position; and
a deflection sensor comprising:
a first gyroscope rigidly mounted at, or with respect to, the first region so as to generate a first signal which represents rotation of the first region about the one or more orthogonal axes;
a second gyroscope rigidly mounted at, or with respect to, the second region so as to generate a second signal which represents rotation of the second region about the one or more orthogonal axes, the second gyroscope being synchronised in time with the first; and
a controller communicatively coupled to the first and second gyroscopes to receive the first and second signals, the controller being configured to subtract one of the first and second signals from the other to obtain a differential signal which represents the degree of deflection of the second region relative to the first region due to flexing of the flexible region.

Thus, the aircraft assembly according to the first aspect of the invention includes a deflection sensor, which uses differential gyroscope readings to determine deflection of a region due to flexing of a flexible region of the aircraft assembly. The gyroscopes are rigidly mounted so that angular or rotational movements of the first and second regions of the assembly are reliably transferred to the gyroscopes. The first region is selected due to it having greater positional stability than the second region, meaning that it is less likely to deflect in use. This can for example be due to the first region being stiffer than the second region and/or the flexible region. As such, the first signal, output by the first gyroscope, describes movement of the assembly as a whole whereas the differential signal between the first and second signals describes the degree of deflection of the second region relative to the first region due to flexing of the flexible region. For a given aircraft assembly, deflection envelopes for various regions will be known from known methods. Measured in-use deflections can be used for determining, identifying and/or qualifying events such as hard landings, over-deflections, true in-service loading and/or aircraft weight and balance. They can also be used to determine loads that have been applied to the aircraft assembly.

In comparison to known sensors, a deflection sensor according to an embodiment of the invention can have one or more of the following advantages:
improved sensitivity and accuracy for quantification of small static and dynamic structural deflections
improved measurement bandwidth
improved temperature resilience
Improved vibration resilience
reduced complexity
suitability for Line Replaceable Units
being relatively lightweight
reliability for aerospace applications
requiring fewer recalibrations
can measure deflections in multiple orthogonal axes
suitable for on-board landing gear applications
lightweight and low power
does not interfere with primary functions of a landing gear
can work independently from landing gear systems and components
is not dependent on friction effects The first region can have greater positional stability than the second region due to it being at or adjacent to an attachment formation via which the aircraft assembly is arranged to be coupled to another aircraft assembly, such as a spar, airframe and fuselage.

For example, if the flexible region is an aircraft landing gear main strut, the first region can be at or adjacent to the primary attachment lugs via which the strut is pivotally coupled to the airframe, such as in a 'torque tube' cylinder. The second region can be a lower part of the strut to measure deflection of the strut. Alternatively, the first region can be at or adjacent to the airframe which defines the landing gear bay and the second region can be a lower part or region of the strut.

The strut can be a main shock absorbing strut comprising a main fitting or outer cylinder, which defines the primary attachment lugs, slidably coupled to an inner sliding tube, on which the second region is located. In such a case, the deflection sensor can further comprise a displacement sensor arranged to measure the extension state of the shock absorber. This enables the controller to accurately relate the differential signal to deflection of the second region. The displacement sensor should be as precise as the gyroscopes.

The flexible region can alternatively be an axle of an aircraft landing gear assembly. In such an embodiment, first region can be located at the coupling region between the lower end of the sliding tube and the axle. The second region can be a region towards a free end of the axle in order to measure for example deflection of the axle adjacent the wheel and brake assembly due to flexing of the axle due to landing and taxiing loads.

The deflection sensor can comprise one or more further gyroscopes each rigidly mounted at, or with respect to, further regions so as to each generate a further signal, which represents rotation of the further region about one or more orthogonal axes. Each further region is spaced from the first or second region or a different further region by a further flexible region, the first or second region or different further region having greater positional stability than the further region such that flexing of the further flexible region due to in-use loads causes the further region to deflect further from its default position than the first or second region or different further region deflects from its default position. In such embodiments, the controller is communicatively coupled to each of further gyroscopes to receive the further signals and process them in the same manner to obtain a differential signal, which represents the degree of deflection of the further region relative to the reference region.

The gyroscopes can each be rigidly mounted at or adjacent to the respective regions by being directly coupled to the regions; for example, by being bonded to an external or internal surface of the assembly at the region, or mounted within a recess or hole.

Alternatively, the gyroscopes can each be rigidly mounted at or adjacent to the respective regions by rigid brackets. This can advantageously enable the gyroscopes to be located in free space within or outside parts of the aircraft assembly and can assist in aligning the detection axes of the gyroscopes with the one or more orthogonal axes of interest.

One or more or each gyroscope can be arranged to measure rotation in three orthogonal axes.

One or more or each gyroscope can form part of a distinct inertial measurement unit (IMU) including one or more accelerometers arranged to measure accelerations in one or more and preferably all three of the orthogonal axes of interest. This advantageously enables the deflection sensor to measure both rotation and translation of the regions due to deflection.

It is preferred that the gyroscopes/IMUs of a measurement pair are equal in nature e.g. the same make and model as one another. When using gyroscopes/IMUs of the same provider, same model and under similar temperatures and accelerations, by subtracting recordings from corresponding pairs of gyroscopes/IMUs in order to extract the resulting deflections, the inherent drifts in the discrete units will be substantially cancelled.

It is preferred that each IMU includes auxiliary sensors for contributing to a more precise deflection measurement. For example, compensation sensors such as temperature and pressure sensors. The IMU can also include an inclinometer.

Each gyroscope or IMU should be synchronised in time.

The controller can comprise a plurality of distributed controllers communicatively coupled to one another.

In accordance with a second aspect of the invention, there is provided an aircraft landing gear assembly comprising an aircraft assembly according to the first aspect.

In accordance with a third aspect of the invention, there is provided a computer implemented method of measuring deflection of an aircraft assembly comprising a first region and a second region spaced from the first region by a flexible region, the first region having greater positional stability than the second region such that flexing of the flexible region due to in-service loads causes the second region to deflect further from its default position than the first region deflects from its default position, the method comprising:

receiving at a controller a first signal from a first gyroscope rigidly mounted at, or with respect to, the first region, the first signal representing rotation of the first region about one or more orthogonal axes;

receiving at the controller a second signal from a second gyroscope rigidly mounted at, or with respect to, the second region, the second signal representing rotation of the second region about one or more orthogonal axes, the second gyroscope being synchronised in time with the first; and subtracting one of the first and second signals from the other to obtain a differential signal which represents deflection of second region relative to the first region due to flexing of the flexible region.

Optional features of the first and second aspects apply to the method of the third aspect in an analogous manner.

These and other aspects of the present invention will become apparent from, and clarified with reference to, the embodiments described herein.

BRIEF DESCRIPTION OF THE DRAWINGS

Embodiments of the present invention will now be described, by way of example only, with reference to the accompanying drawings, in which.

SPECIFICATION DESCRIPTION OF EMBODIMENTS OF THE INVENTION

Figure 1:
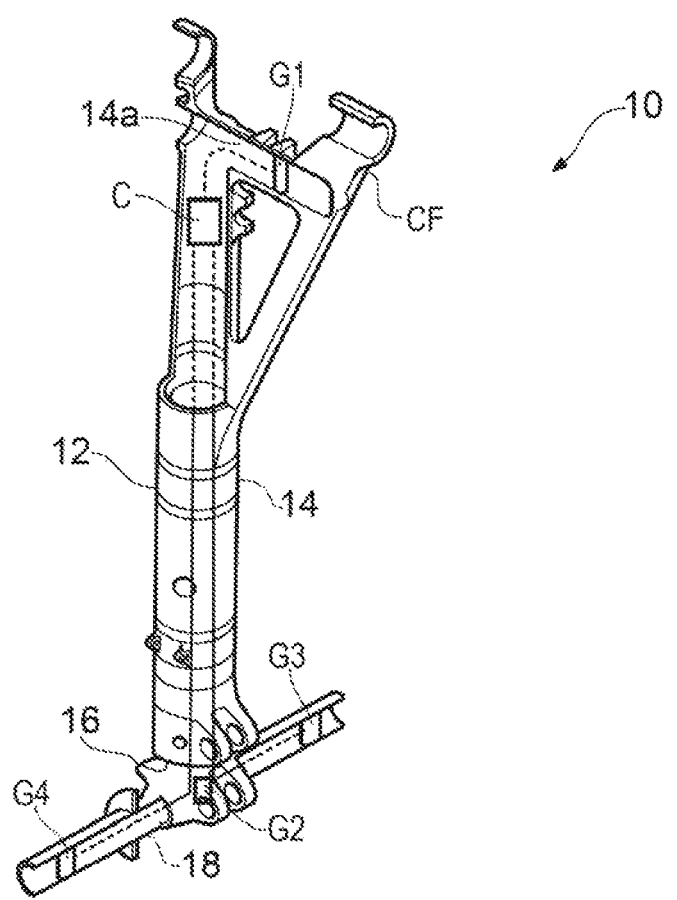
FIG. 1 shows an aircraft landing gear assembly according to an embodiment of the invention.

FIG. 1 shows an aircraft assembly 10 including a deflection sensor according to an embodiment of the invention. Apart from the components of the deflection sensor, the aircraft assembly 10 is of conventional construction.

In this example, the aircraft assembly 10 is an aircraft landing gear assembly 10, but in other embodiments the aircraft assembly 10 can for example include an aircraft landing gear assembly coupled to other components of an aircraft, or can comprise other parts of an aircraft such as a wing assembly or engine assembly. An aircraft can for example be an aeroplane, including a UAV, or a helicopter.

The landing gear assembly 10 includes a shock-absorbing strut 12 having an upper, main fitting or cylinder 14 and a sliding tube 16. The top of the main cylinder 14 is provided with attachment lugs via which the landing gear assembly 10 is arranged to be pivotally coupled to an aircraft (not shown) for movement between a deployed condition for take-off and landing and a stowed condition for flight. The assembly 10 can alternatively include a conventional rigid strut or trailing arm type strut. A transverse axle 18 is mounted at a lower end of the sliding tube 16 for mounting wheel and brake assemblies.

Figures 2A, 2B:
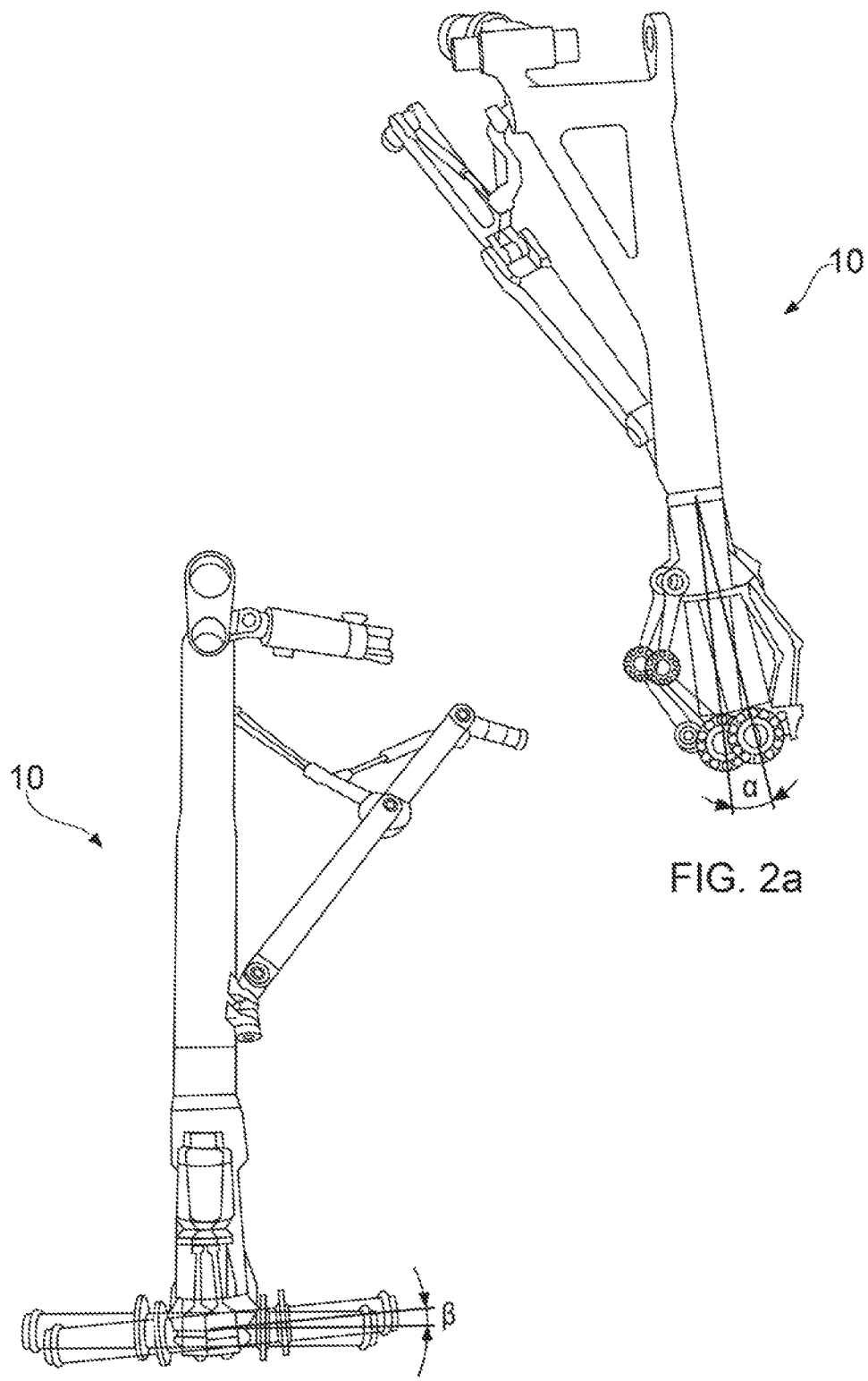
FIGS. 2a to 2c illustrate deflection of the aircraft assembly of FIG. 1 in three respective orthogonal axes.
Figure 2C:
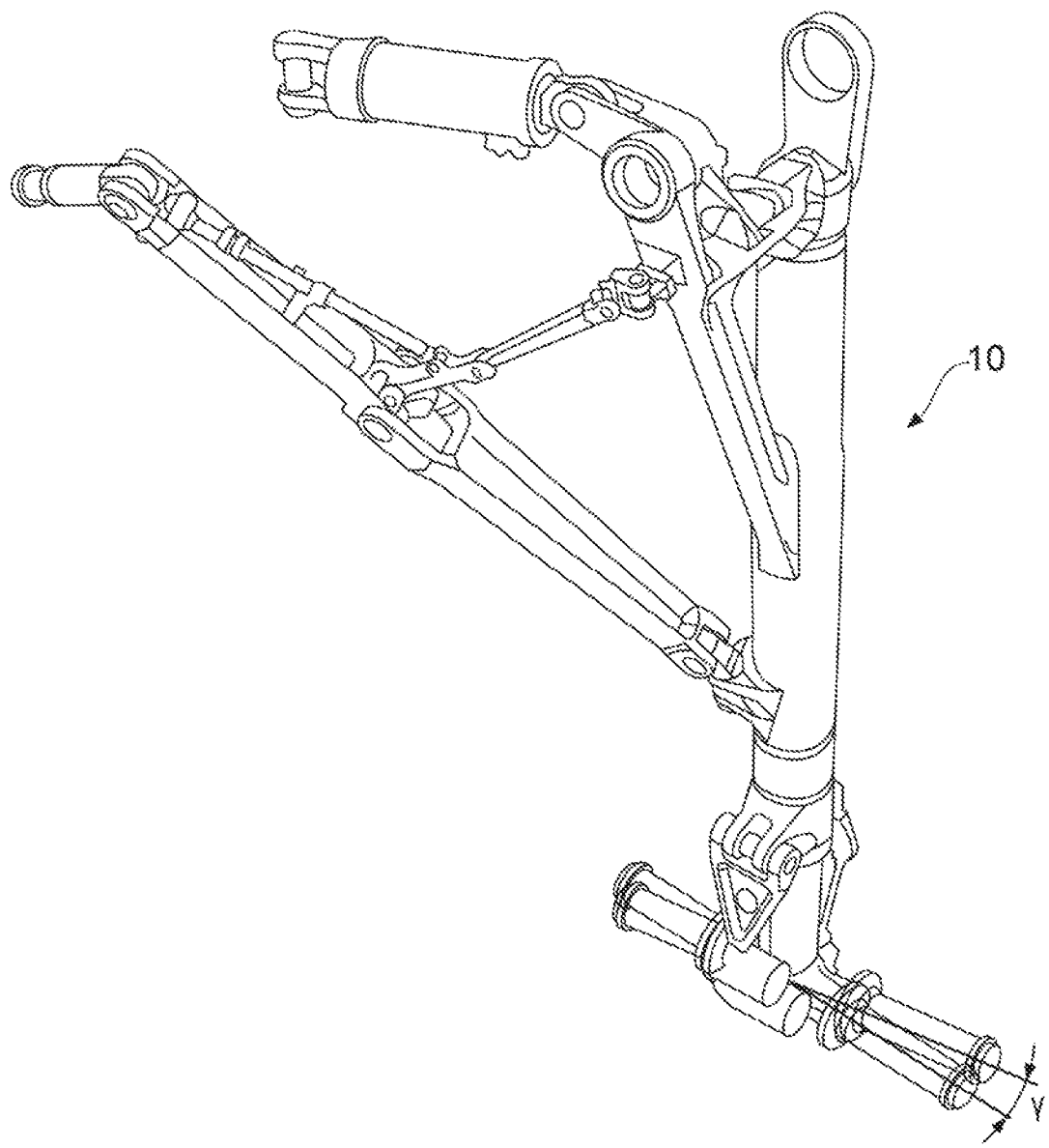

Referring additionally to FIGS. 2a to 2c, the landing gear assembly 10 is subjected to a complex set of loads during in-service use. Such loading causes components of the landing gear assembly to deflect. Deflection is the degree to which a component is displaced under a load from its original/previously defined and constrained position, most commonly from its neutral axis. Deflections can be expressed as linear and/or angular and can be described in three orthogonal axes or planes (a, 0, y). The deflection distance of a component under a load is directly proportional to the slope (angle) of the deflected shape of the member under that load and can be calculated by integrating the function that mathematically describes the slope of the member under that load.

The term 'deflection' is used herein to mean the distance that an object bends or an angle by which a region of component twists from its original constrained or default position. This is in contrast with rigid movement I.e. displacement of the component. Displacement is a difference in distance between the final and initial position of a component, when it moves in space as a rigid body. Displacement can be translational, rotational or combined.

Deflection sensors according to embodiments of the invention enable precise measurement of in-service deflections, mainly angular deflections, around one or more axes of interest.

The deflection sensor in the illustrated embodiment comprises four gyroscopes G1 to G4 each mounted at a distinct region of the assembly. Each region is selected as a predefined point, axis or plane of interest on the landing gear assembly 10. The gyroscopes G1 to G4 are synchronized to the same time reference to enable their outputs over time to be related to one another.

The gyroscopes G1 to G4 are preferably vibratory microelectromechanical systems (MEMS) based gyroscopes, such as MEMS Coriolis Vibratory Gyroscopes. Other types of gyroscopes can be utilised, such as fiber-optic gyroscopes, hemispherical resonator gyroscope, ring laser gyroscopes, etc.

The gyroscopes G1 to G4 are utilised in pairs to measure deflection, with one serving as a reference gyroscope and the other as a sensing gyroscope. The reference gyroscope can be installed close to an attachment point or location considered to be a reference, while the sensing gyroscope(s) can each be installed close to the point or plane coinciding with a deflection of interested to measure. The difference between the readings of each pair of gyroscopes is the angle to which the structure has deflected, while being loaded. Deflection angle is the direct measure of a structural deflection, which can be related to loading level.

Figure 3A:
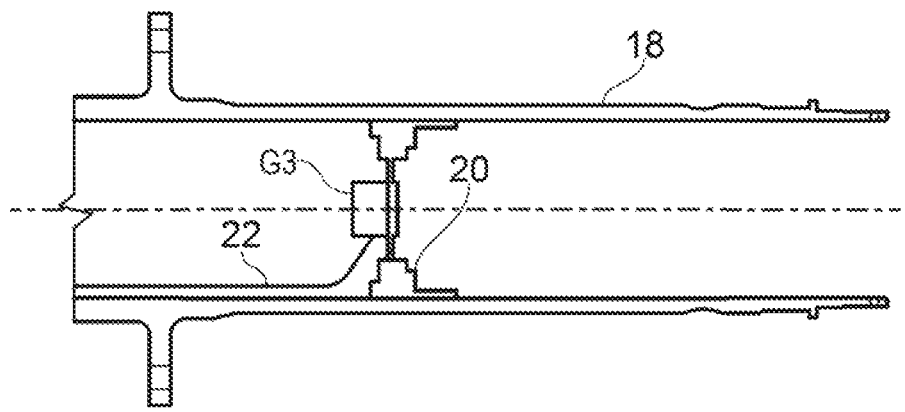
FIGS. 3a and 3b illustrate deflection of the axle of the aircraft assembly of FIG. 1 in three orthogonal axes.
Figure 3B:
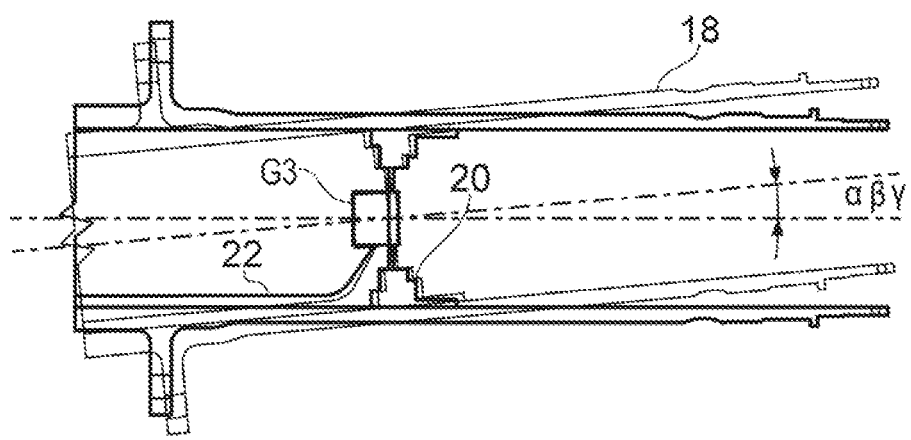

Referring additionally to FIGS. 3a and 3b each gyroscope is coupled to the respective region of the assembly by means of rigid attachment brackets 20 or the like, where each attachment 20 is rigid enough to reliably receive component deflections without changing them on their path to the gyroscope G1-G4 rigidly installed on the attachment 20.

Deflections experienced by the gyroscopes G1 to G4 generate electrical signals, which are feed via electrical harnesses 22, or wirelessly, into one or more data acquisition modules of the controller C, which is preferably installed close to the component or region being measured. The electrical signals received from the gyroscopes G1 to G4 can be converted by the controller C into angular rates, deflection angles, incremental angels, average angles, etc. The differential signal between couples of individual readings is a direct indication of the degree of deflection of the second region relative to the first region where gyroscopes pairs are installed.

Thus, by measuring angular rate, or velocity of rotation [°/s], the following can be determined from the gyroscopes G1 to G4:
 average angular rate [°/s]
 incremental angle [°/sample]
 integrated angle [°], from angular rate by direct integration
 directly measured angle [°], by use of alternative methods without angular rate integration In the illustrated embodiment, the first and second gyroscopes G1 and G2 form a first pair, arranged to measure deflection of the shock-absorbing strut 12 during landing or taxiing for example. The first gyroscope G1 is mounted in the torque tube 14a at the top of the main cylinder 14. The second gyroscope G2 is mounted at a coupling region where the axle 18 is coupled to the sliding tube 16. The torque tube 14a region, being adjacent to the main coupling formation CF, is relatively rigid in nature in comparison to the axle coupling region. As such, the torque tube 14a region has greater positional stability than the axle coupling region. In use, deflection of the strut 12 will cause the axle coupling region to deflect further from its initial position than the torque tube 14a region will deflect from its initial position. As such, the first gyroscope G1 can be used to measure rotational displacement of the landing gear assembly 10 as a whole, whereas deflection of the second coupled region relative to the torque tube 14a due to flexing of the strut 12 can be measured by the difference between the outputs from the first and second gyroscopes G1, G2.

The second and third gyroscopes G2 and G3 form a second pair, arranged to measure deflection of one side of the axle 18. In this case, G2 is mounted at the relatively rigid coupling region in comparison to the mounting region MR where the third gyroscope G3 is provided. Thus, G2 serves as the reference gyroscope in this case and G3 is the sensing gyroscope.

The third pair of gyroscopes G2 and G4 are arranged to measure deflection of the other side of the axle 18.

In preferred embodiments, each gyroscope comprises or forms part of a distinct three-axis gyroscope and more preferably an Inertial Measurement Unit (IMU) that can also measure accelerations, preferably in three axes. This advantageously enables the deflection sensor to measure both rotation and translation of the regions due to deflection. It is preferred that each IMU includes auxiliary sensors for contributing to a more precise deflection measurement. For example, compensation sensors such as temperature and pressure sensors. The IMU can also include an inclinometer. Use of IMUs for measurement pairs can enable the full trajectory of the assembly prior to a landing, and after, to be determined, thereby providing invaluable information about the input, which resulted with the measured deflections (output). Knowing the output and knowing the exact input can provide a complete understanding of in-service performance, integrity of a structure, transfer function, etc.

It is preferred that the gyroscopes/IMUs of a measurement pair are equal in nature e.g. the same make and model as one another. When using gyroscopes/IMUs of the same provider, same model and under similar temperatures and accelerations, by subtracting recordings from corresponding pairs of gyroscopes/IMUs in order to extract the resulting deflections, the inherent drifts in the discrete units will be substantially cancelled.

If the gyroscopes of a measurement pair are mounted on different components of the assembly 10 which in use are arranged to move relative to one another, such as G1 and G2, then the deflection sensor should include or be communicatively coupled to a displacement sensor for measuring the relative displacement. For example, a sensor can be used to measure displacement of the sliding tube 16 relative to the main cylinder 14 during shock absorber extension and compression. Examples of such sensors are: rotary potentiometers; inductive angle encoders; linear variable differential transformers; string potentiometers; videogrammetry sensors; differential accelerometers; proximity sensors; microwave sensors; optical sensors; and LIDAR scanners.

Figure 4:
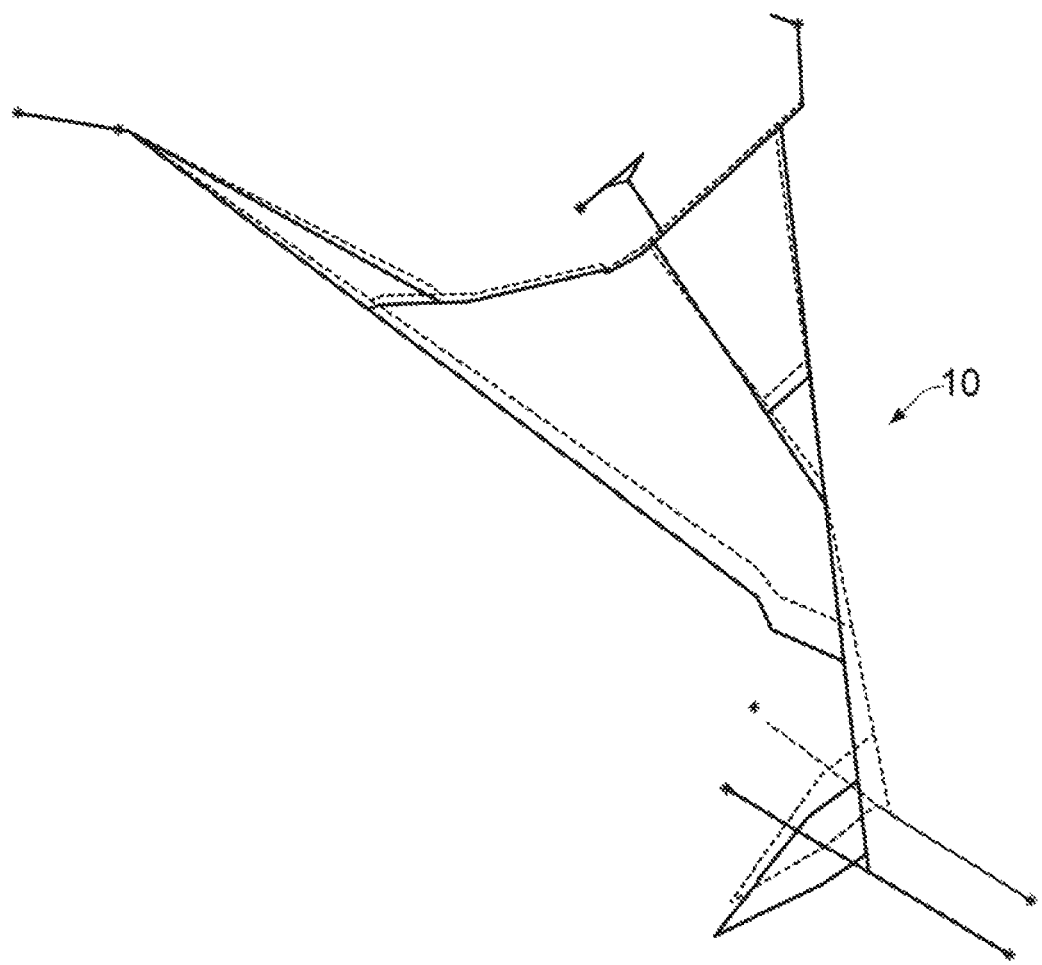
FIG. 4 is a diagram illustrating deflection of the landing gear assembly of FIG. 1 due to a specific applied load.

Referring additionally to FIG. 4, computer modelling can be used to determine how a landing gear assembly deflects in response to an applied load, as illustrated by the flexing of the landing gear assembly 10 between the solid and dashed lines.

Figure 5:
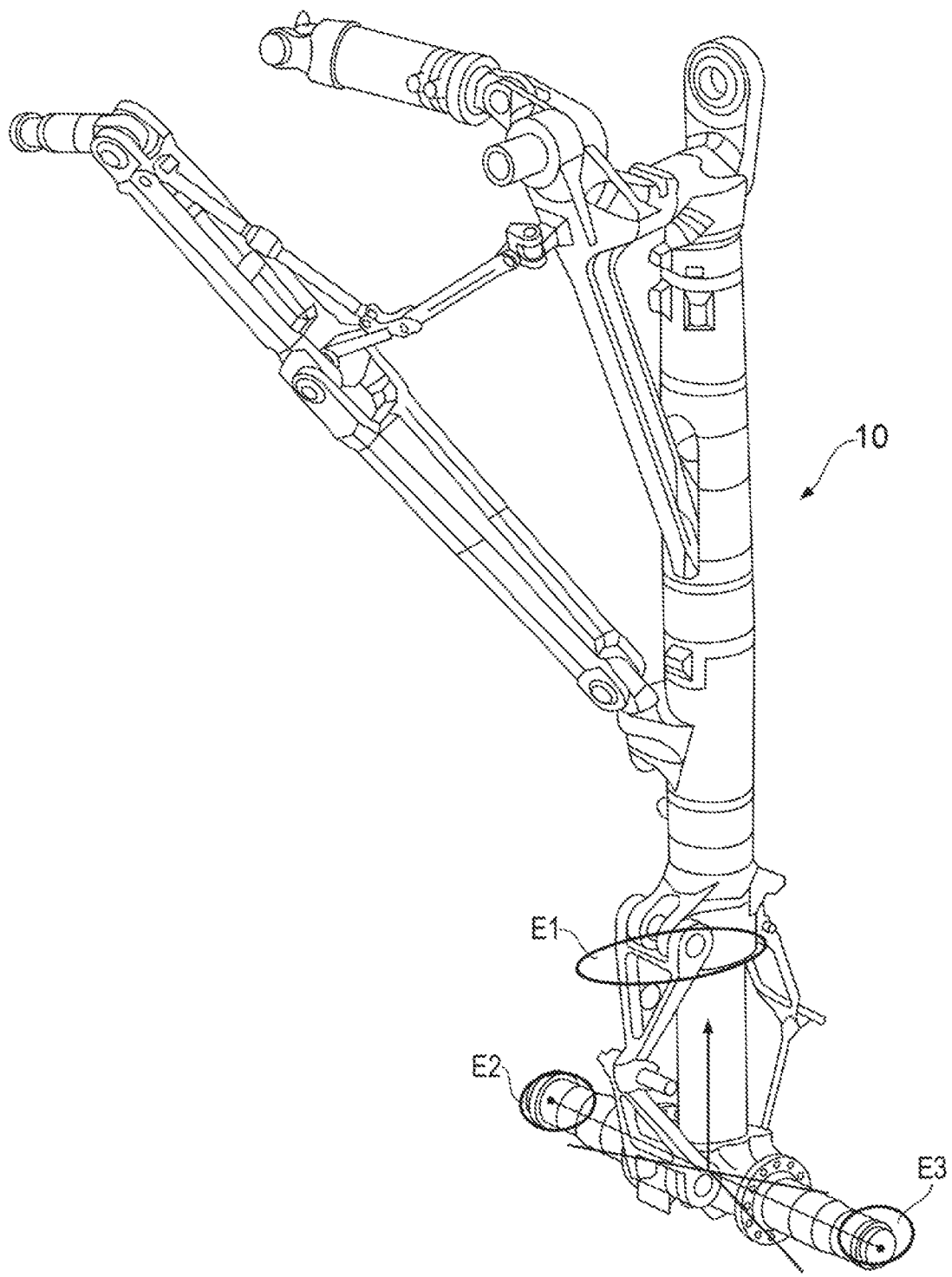
FIG. 5 is a diagram illustrating deflection envelopes of regions of the landing gear assembly of FIG. 1.

Referring additionally to FIG. 5, deflection envelopes E1 to E3 for various regions of the landing gear assembly 10 can be determined by computer modelling deflections for various different applied loads. As illustrated, a deflection envelope E1 to E3 is an area or volume in which a region of the assembly is expected or allowed to deflect in-service. Measured in-use deflections can be used for determining, identifying and/or qualifying events such as hard landings, over-deflections, true in-service loading and/or aircraft weight and balance. They can also be used to determine loads that have been applied to the aircraft assembly.

Figure 6:
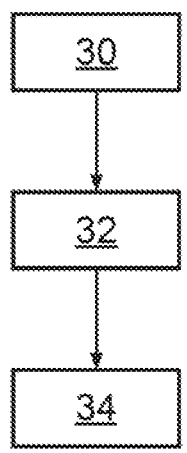
FIG. 6 is a flow chart illustrating a method according to an embodiment of the invention.

FIG. 6 illustrates a computer implemented method of measuring deflection of an aircraft assembly comprising a first region and a second region spaced from the first region by a flexible region, the first region having greater positional stability than the second region such that flexing of the flexible region due to in-use loads causes the second region to deflect further from its default position than the first region deflects from its default position.

At step 30 the method comprises receiving at a controller a first signal from a first gyroscope rigidly mounted at, or with respect to, the first region, the first signal representing rotation of the first region about one or more orthogonal axes.

At step 32 the method comprises receiving at the controller a second signal from a second gyroscope rigidly mounted at, or with respect to, the second region, the second signal representing rotation of the second region about one or more orthogonal axes, the second gyroscope being synchronised in time with the first At step 34 the method comprises subtracting one of the first and second signals from the other to obtain a differential signal which represents level of deflection of second region relative to the first region due to flexing of the flexible region.

Thus, an aircraft assembly according to embodiments of the invention includes a deflection sensor, which uses differential gyroscope readings to measure deflection of a flexible region of the aircraft assembly. The gyroscopes are rigidly mounted so that they reliably receive/experience angular/rotational movements of the first and second regions of the assembly. The first region is configured such that in use it has greater positional stability than the second region. As such, the first signal, output by the first gyroscope, describes movement of the assembly as a whole whereas the difference between the first and second signals describes the degree of deflection of the second region relative to the first region due to flexing of the flexible region. For a given aircraft assembly, deflection envelopes for various regions will be known from known methods. Measured in-use deflections can be used for determining, identifying and/or qualifying events such as hard landings, over-deflections, true in-service loading and/or aircraft weight and balance. They can also be used to determine loads that have been applied to the aircraft assembly.

Although the deflection sensor according to embodiments of the invention has been described with reference to an aircraft assembly, in other embodiments it could be applied to structures such as wind turbine blades, civil structures such as bridges and/or to rotating shafts.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" does not exclude the presence of elements or steps other than those listed in any claim or the specification as a whole. The singular reference of an element does not exclude the plural reference of such elements and vice-versa. Parts of the invention may be implemented by means of hardware comprising several distinct elements, or by a suitably programmed computer. In a device claim enumerating several parts, several of these parts may be embodied by one and the same item of hardware. The mere fact that certain measures are recited in mutually different dependent claims does not indicate that a combination of these measures cannot be used to advantage.

The invention claimed is:

1. An aircraft landing gear assembly comprising:
   a shock-absorbing strut comprising a cylinder and a sliding tube;
   attachment lugs configured to couple the shock-absorbing strut to an aircraft airframe;
   a first region at or adjacent to the attachment lugs;
   a second region spaced from the first region by a flexible region, the flexible region comprising at least a portion of the shock-absorbing strut, the first region having greater positional stability than the second region such that flexing of the flexible region due to in-use loads causes the second region to deflect further from a second default position than the first region deflects from a first default position; and
   a deflection sensor comprising:
      a first gyroscope rigidly mounted at, or with respect to, the first region so as to generate a first signal which represents rotation of the first region about one or more orthogonal axes;
      a second gyroscope rigidly mounted at, or with respect to, the second region so as to generate a second signal which represents rotation of the second region about the one or more orthogonal axes, the second gyroscope being synchronised in time with the first gyroscope; and
      a controller communicatively coupled to the first and second gyroscopes to receive the first and second signals, the controller being configured to subtract one of the first and second signals from the other to obtain a differential signal which represents deflection of the second region relative to the first region due to flexing of the flexible region.

2. The aircraft assembly according to claim 1, wherein the first region is at or adjacent to an attachment formation via which a component of the assembly is arranged to be coupled to another component of the assembly.

3. The aircraft assembly according to claim 2, wherein the flexible region is an aircraft landing gear main strut, the first region is at or adjacent to coupling lugs via which the strut is arranged to be pivotally coupled to an airframe and the second region is relatively closer to a distal end of the strut with respect to the coupling lugs to measure deflection of the strut.

4. The aircraft assembly according to claim 3, wherein strut is a main shock absorbing strut comprising an outer cylinder, which defines the coupling lugs, slidably coupled to an inner sliding tube, on which the second region is located, and wherein the deflection sensor further comprises a shock absorber extension sensor arranged to measure an extension state of the main shock absorbing strut.

5. The aircraft assembly according to claim 2, wherein the flexible region is an aircraft landing gear main strut, the first region is at or adjacent to an airframe which defines a landing gear bay and the second region is relatively closer to a distal end of the strut with respect to the airframe which defines the landing gear bay.

6. The aircraft assembly according to claim 1, wherein the deflection sensor comprises one or more further gyroscopes each rigidly mounted at, or with respect to, further regions so as to each generate a further signal which represents rotation of the further region about the one or more orthogonal axes, wherein each further region is spaced from the first or second region or a different further region by a further flexible region, the first or second region or different further region having greater positional stability than the further region such that flexing of the further flexible region due to in-use loads causes the further region to deflect further from its default position than the first or second region or different further region deflects from its default position and wherein the controller is communicatively coupled to each of further gyroscopes to receive the further signals and process them in the same manner to obtain a differential signal which represents deflection of the further flexible region.

7. The aircraft assembly according to claim 1, wherein the gyroscopes are each rigidly mounted at or adjacent to the respective regions by rigid brackets.

8. The aircraft assembly according to claim 1, wherein one or more or each gyroscope is an array of gyroscopes arranged to measure rotation in three orthogonal axes.

9. The aircraft assembly according to claim 1, wherein the first gyroscope and the second gyroscope are of equal construction.

10. The aircraft assembly according to claim 1, wherein one or more or each gyroscope forms part of an inertial measurement unit (IMU) including one or more accelerometers arranged to measure accelerations in the one or more orthogonal axes.

11. The aircraft assembly according to claim 10, wherein the one or more accelerometers are arranged to measure accelerations in three orthogonal axes.

12. The aircraft assembly according to claim 1, wherein the controller comprises a plurality of distributed controllers communicatively coupled to one another.

13. A computer implemented method of measuring deflection of an aircraft assembly according to claim 1, comprising a first region and a second region spaced from the first region by a flexible region, the first region having greater positional stability than the second region such that flexing of the flexible region due to in-use loads causes the second region to deflect further from a second default position than the first region deflects from a first default position, the method comprising:
receiving at a controller a first signal from a first gyroscope rigidly mounted at, or with respect to, the first region, the first signal representing rotation of the first region about one or more orthogonal axes;
receiving at the controller a second signal from a second gyroscope rigidly mounted at, or with respect to, the second region, the second signal representing rotation of the second region about one or more orthogonal axes, the second gyroscope being synchronised in time with the first gyroscope; and
subtracting one of the first and second signals from the other to obtain a differential signal which represents level of deflection of second region relative to the first region due to flexing of the flexible region.

14. An aircraft landing gear assembly comprising:
a shock-absorbing strut comprising a cylinder and a sliding tube;
an axle transverse to the shock-absorbing strut;
a first region;
a second region spaced from the first region by a flexible region, the first region having greater positional stability than the second region such that flexing of the flexible region due to in-use loads causes the second region to deflect further from a second default position than the first region deflects from a first default position; and
a deflection sensor comprising:
a first gyroscope rigidly mounted at, or with respect to, the first region so as to generate a first signal which represents rotation of the first region about one or more orthogonal axes;
a second gyroscope rigidly mounted at, or with respect to, the second region so as to generate a second signal which represents rotation of the second region about the one or more orthogonal axes, the second gyroscope being synchronised in time with the first gyroscope; and
a controller communicatively coupled to the first and second gyroscopes to receive the first and second signals, the controller being configured to subtract one of the first and second signals from the other to obtain a differential signal which represents deflection of second region relative to the first region due to flexing of the flexible region;
wherein the flexible region comprises the axle and, the second region is relatively closer to a free end of the axle than the first region is, and the deflection sensor is arranged to measure deflection of the axle.

15. An aircraft landing gear assembly comprising:
a shock-absorbing strut comprising a cylinder and a sliding tube;
an axle transverse to the shock-absorbing strut;
a first region;
a second region spaced from the first region by a flexible region, the first region having greater positional stability than the second region such that flexing of the flexible region due to in-use loads causes the second region to deflect further from a second default position than the first region deflects from a first default position; and
a deflection sensor comprising:
a first gyroscope rigidly mounted at, or with respect to, the first region so as to generate a first signal which represents rotation of the first region about one or more orthogonal axes;
a second gyroscope rigidly mounted at, or with respect to, the second region so as to generate a second signal which represents rotation of the second region about the one or more orthogonal axes, the second gyroscope being synchronised in time with the first gyroscope; and
a controller communicatively coupled to the first and second gyroscopes to receive the first and second signals, the controller being configured to subtract one of the first and second signals from the other to obtain a differential signal which represents deflection of the second region relative to the first region due to flexing of the flexible region;

wherein the first or second region is at or adjacent the middle of the axle, and the flexible region comprises at least a portion of the shock-absorbing strut or at least a portion of the axle.

* * * * *